US010708746B2

(12) United States Patent
Qi et al.

(10) Patent No.: US 10,708,746 B2
(45) Date of Patent: Jul. 7, 2020

(54) METHODS, SYSTEMS, AND DEVICES FOR BLUETOOTH LOW ENERGY DISCOVERY

(71) Applicant: Intel IP Corporation, Santa Clara, CA (US)

(72) Inventors: Emily H. Qi, Gig Harbor, WA (US); Carlos Cordeiro, Portland, OR (US); Robert Hughes, Tualatuin, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/193,940

(22) Filed: Nov. 16, 2018

(65) Prior Publication Data

US 2019/0182647 A1 Jun. 13, 2019

Related U.S. Application Data

(63) Continuation of application No. 14/749,996, filed on Jun. 25, 2015, now abandoned.

(60) Provisional application No. 62/114,966, filed on Feb. 11, 2015.

(51) Int. Cl.
*H04W 4/80* (2018.01)
*H04W 8/00* (2009.01)
*H04W 84/18* (2009.01)
*H04W 8/24* (2009.01)

(52) U.S. Cl.
CPC ............. *H04W 4/80* (2018.02); *H04W 8/005* (2013.01); *H04W 8/24* (2013.01); *H04W 84/18* (2013.01)

(58) Field of Classification Search
CPC ......... H04W 4/80; H04W 8/005; H04W 8/24; H04W 84/18
USPC ....................................... 455/41.2
See application file for complete search history.

(56) References Cited

U.S. PATENT DOCUMENTS

2015/0172391 A1* 6/2015 Kasslin .................. H04L 67/16
370/338

* cited by examiner

*Primary Examiner* — Eugene Yun
(74) *Attorney, Agent, or Firm* — Eversheds Sutherland (US) LLP

(57) ABSTRACT

Embodiments of the present disclosure include methods, devices and systems for Bluetooth low energy discovery in wireless application service platforms. One example embodiment relates to transmitting, by a first terminal including a radio, a request message for seeking service, receiving, by a peer terminal, the request message for seeking service, transmitting to the first terminal, by the peer terminal, a response frame advertising service including service provider information.

17 Claims, 10 Drawing Sheets

METHODS, SYSTEMS, AND DEVICES FOR BLUETOOTH LOW ENERGY DISCOVERY

CROSS-REFERENCE TO RELATED APPLICATIONS

This application is a continuation of U.S. non-provisional application Ser. No. 14/749,996, filed Jun. 25, 2015, claims priority of U.S. provisional application No. 62/114,966 titled "Methods, Systems, and Devices for Bluetooth Low Energy Discovery" which was filed on Feb. 11, 2015, the disclosures of which are incorporated herein by reference in their entireties.

TECHNICAL FIELD

Embodiments described herein generally relate to systems, methods and devices for Bluetooth low energy discovery, and more particularly to systems, methods and devices for Bluetooth low energy discovery in wireless application service platforms.

BACKGROUND

A typical Wi-Fi network is deployed with control equipment known as wireless access points (APs), for example, base stations (BSs) or hot spots. The wireless APs provide service provisioning involving physical support for wired and wireless networks, bridging and routing between network equipment, and connection and release of the connection between network equipment.

Wi-Fi Direct is a technology for enabling direct communication between Wi-Fi terminals without intervention of Wi-Fi APs that support connections between Wi-Fi terminals. A Wi-Fi terminal discovers a peer Wi-Fi terminal by device discovery and detects an intended service type by service discovery, thereby establishing a connection for Wi-Fi Direct communication with the peer Wi-Fi terminal.

After device discovery, the Wi-Fi terminal may determine whether the discovered peer Wi-Fi terminal supports a specific service by service discovery, for Wi-Fi Direct communication. The service discovery only supports acquisition of information about service types supported by the peer Wi-Fi terminal. Therefore, even though the transmitting terminal acquires information about the services supported by the receiving terminal, it does not have knowledge of the receiving terminal's intention as to whether it will receive a specific file or service from the transmitting terminal.

After allowing a device connection with the transmitting terminal, the receiving terminal does not know information (e.g. the name, file type, and the like) about the specific file or service until it starts to receive the file or service from the transmitting terminal. If the receiving terminal does not want to receive the file or service, the receiving terminal may cancel reception of the file or service during file transmission after a Wi-Fi Direct connection has already been established between the transmitting terminal and the receiving terminal.

In other words, Wi-Fi Direct provides a peer-to-peer connectivity to allow users to connect their devices in an easy and convenient manner to share, show, print, and synchronize content. Wi-Fi Direct devices may use probe request frame and probe response frame to discover Wi-Fi devices in the proximity, and then use P2P service discovery query/response frames to find supporting services in these devices. Once a Wi-Fi Direct device finds a matching service(s) in a target peer device, the device proceeds with setting up a P2P connection with the peer device.

DETAILED DESCRIPTION

Figure 1:
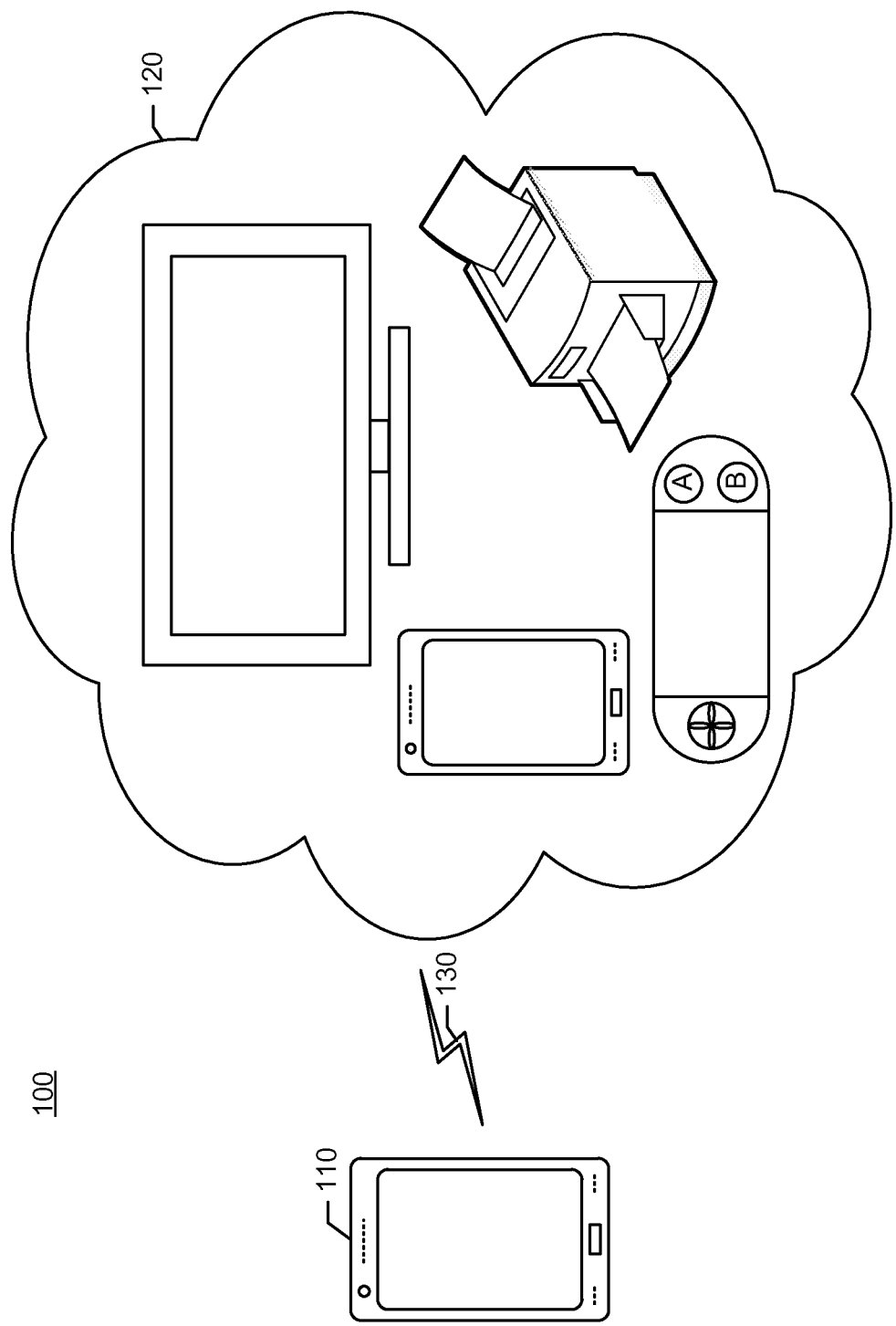
FIG. 1 illustrates a configuration of an example system to which a Wireless Fidelity (Wi-Fi) Direct connection is applied, according to at least one embodiment.

Example embodiments described herein provide certain systems, methods, and devices, for Bluetooth low energy discovery in wireless application service platforms.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device," and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, a user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one-way and/or two-way radio communication systems, cellular radio-telephone communication systems, a mobile phone, a cellular telephone, a wireless telephone, a personal communication systems (PCS) device, a PDA device which incorporates a wireless communication device, a mobile or portable global positioning system (GPS) device, a device which incorporates a GPS receiver or transceiver or chip, a device which incorporates a radio frequency identification (RFID) element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MCM), discrete multi-tone (DMT), Bluetooth®, global positioning system (GPS), Wi-Fi, Wi-Max, ZigBee™, ultra-wideband (UWB), global system for mobile communication (GSM), 2G, 2.5G, 3G, 3.5G, 4G, fifth generation (5G) mobile networks, 3GPP, long term evolution (LTE), LTE advanced, enhanced data rates for GSM evolution (EDGE), or the like. Other embodiments may be used in various other devices, systems, and/or networks.

Embodiments of the disclosure provide numerous technical effects and unobvious solutions over conventional methods. For example, FIG. 1 illustrates a configuration of an example system 100 to which a Wi-Fi Direct, peer-to-peer, Bluetooth low energy (BLE), or NFC radio connection 130 may be applied according to at least one embodiment of the present disclosure.

In FIG. 1, a transmitting terminal 110 and a receiving terminal 120 are shown. The transmitting terminal 110 may be a Wi-Fi terminal that may act as both a sender and a service seeker, and each of the receiving terminals 120 is a Wi-Fi terminal that may act as both a receiver and a service advertiser. For the convenience of description, the terms "transmitting terminal" and "receiving terminal" are used. One or more receiving terminals 120 may exist. For example, each of the transmitting and receiving terminals 110 and 120 may be an electronic device having a built-in Wi-Fi module, which may be any of various electronic devices operating in conformance to at least one of many communication protocols used for various communication systems, such as a mobile communication terminal, a smart phone, a tablet, a phablet, a portable multimedia player (PMP), a digital broadcasting player, a personal digital assistant (PDA), a music player, a wearable computer device, a display device, a portable game console, a printer, a camera, or the like. Additionally, each of the transmitting and receiving terminals 110 and 120 may be included in a large-size or mid-size terminal such as a television (TV), a large format display (LFD), a digital signage (DS), a media pole, a personal computer (PC), a laptop, a printer, or a composite device.

In accordance with an embodiment, the radio connection 130 may be a Wi-Fi Direct connection 130 between the transmitting terminal 110 and a receiving terminal 120 and establish a mutual Wi-Fi connection between the transmitting terminal 110 and the receiving terminal 120 in a direct access (DA) mode. In this system 100, the Wi-Fi terminals 110 and 120, which are in proximity to each other, may establish a Wi-Fi Direct connection with each other using their built-in Wi-Fi modules or Wi-Fi modules connected to them as periphery devices without the aid of an AP.

The Wi-Fi terminals 110 and 120 may exchange information about their supported functions with each other. For example, when a user executes a Wi-Fi service-based application in the transmitting terminal 110, the transmitting terminal 110 may identify the supported function information received from the receiving terminal(s) 120. The transmitting terminal 110 may primarily select one or more receiving terminals 120 according to a predetermined criterion, for example, one or more receiving terminals 120 of the same manufacturer as that of the transmitting terminal 110, referring to the supported function information. If one or more receiving terminals 120 are selected, the transmitting terminal 110 may secondarily select a terminal supporting the Wi-Fi service of the application executed in the transmitting terminal 110 from among the primarily selected terminals. If one or more receiving terminals 120 are secondarily selected, the transmitting terminal 110 may select the best receiving terminal 120 for the Wi-Fi service according to the signal qualities, for example, signal strengths of the secondarily selected receiving terminals. The transmitting terminal 110 may request execution of a related application to the best receiving terminal 120 by transmitting information about the executed application.

While the system 100 illustrated in FIG. 1 may establish a Wi-Fi Direct connection between the Wi-Fi terminals 110 and 120, embodiments of the present disclosure are not limited to Wi-Fi Direct connectivity. Specifically, certain embodiments of the present disclosure may be applicable to instances where the Wi-Fi terminals 110 and 120 use wireless local area network (WLAN) and instances where the Wi-Fi terminals 110 and 120 are connected through an AP.

Figure 2:
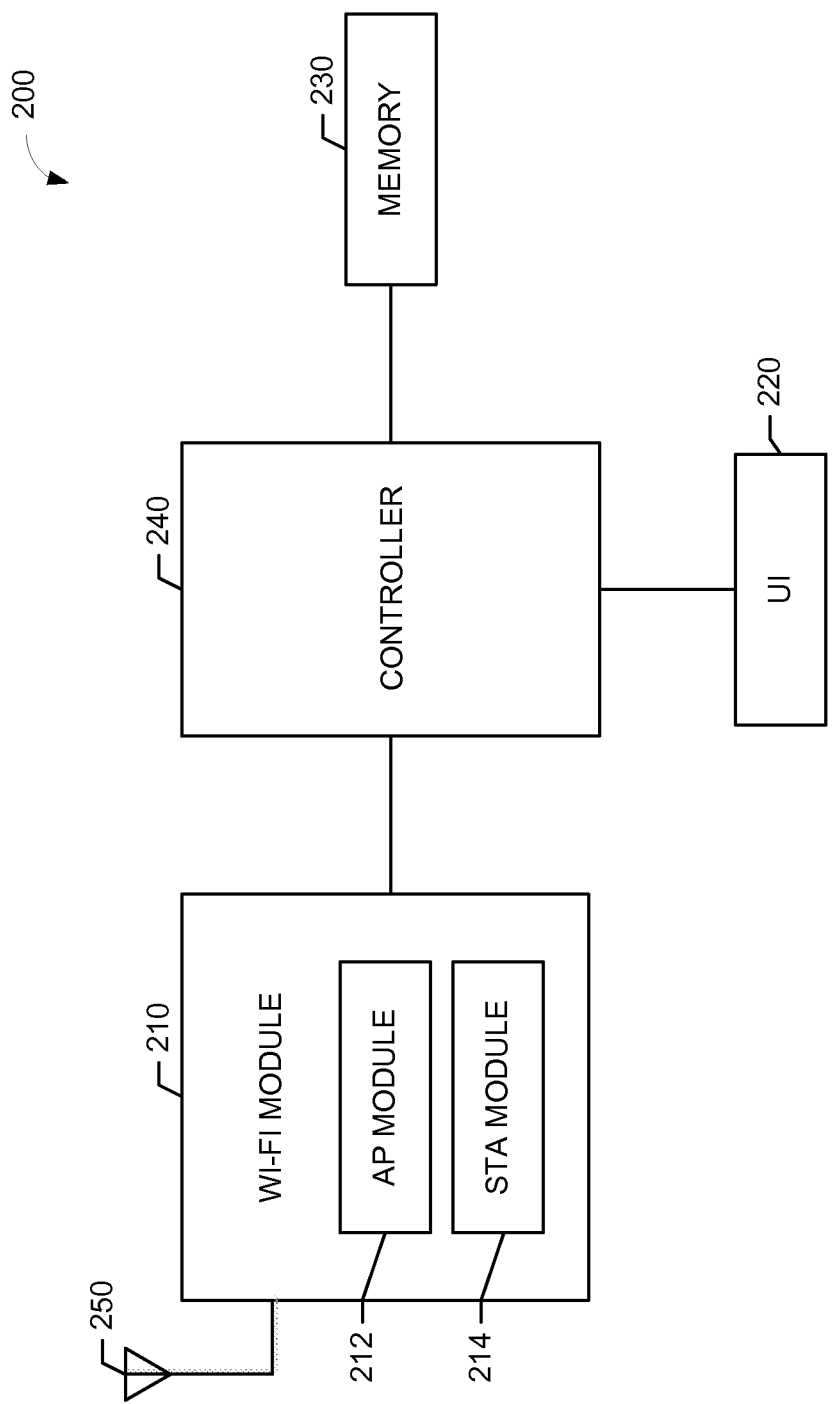
FIG. 2 is a block diagram of an example Wi-Fi terminal, according to at least one embodiment.

FIG. 2 is a block diagram illustrating an example structure of a Wi-Fi terminal 200 according to at least one embodiment of the present disclosure. The Wi-Fi terminal structure may be applicable commonly to the above described transmitting and receiving terminals 110 and 120.

In the embodiment described in FIG. 2, the Wi-Fi terminal 200 may include a Wi-Fi module 210, a user interface (UI) 220, a memory 230, and a controller 240. Besides the components, the Wi-Fi terminal 200 may further include other various components according to its configuration. For example, the Wi-Fi terminal 200 may further include at least one of a display to display a screen, a radio frequency (RF) module to perform a mobile communication function, an audio processor with a microphone and a speaker, a camera module to take a picture, a digital broadcasting module, and/or a Bluetooth communication module to perform a Bluetooth communication function, and/or a NFC communication module to perform a NFC communication function, which are recognized components by those skilled in the art.

The Wi-Fi module 210 may support internet protocol (IP)-based wireless communication between Wi-Fi terminals. The Wi-Fi module 210 may include at least one of an AP module 212 and a station (STA) module 214. The Wi-Fi module 210 may operate in an AP mode by waking up the AP module 212 or in a non-AP mode (e.g. an STA mode) by waking up the STA module 214 under the control of the controller 240. The non-AP mode (e.g. the STA mode) may refer to a mode in which the Wi-Fi terminal functions as a terminal in providing a Wi-Fi service. For example, the non-AP mode may be a mode in which the Wi-Fi terminal 200 functions as the transmitting terminal 110 as described before with reference to FIG. 1. The AP mode refers to a mode in which the Wi-Fi terminal 200 functions as an AP in providing a Wi-Fi service.

Wi-Fi terminal 200 may include one or more radios (not shown) and antennas, such as one or more antennas 250 that enable the computing device to communicate with one or more other computing devices. When the Wi-Fi terminal 200 operates as a sender, the Wi-Fi module 210 may transmit information about attributes of a file to be transmitted under the control of the controller 240 during the establishment of a Wi-Fi Direct connection with a peer Wi-Fi terminal. The file attribute information may be used to exchange service information before a connection is established between the Wi-Fi terminals. The file attribute information may be provided to give a hint to the peer Wi-Fi terminal as to whether incoming of a service session is to be accepted or rejected. For example, in the case of a transmission service of at least one file or content, the file attribute information may include at least one of a note(s) containing information relating to the file(s), the total size of the file(s), the number of files, and the name(s) of the file(s).

When the Wi-Fi terminal 200 operates as a receiver, the Wi-Fi module 210 may receive file attribute information about a file to be transmitted by the peer Wi-Fi terminal during establishing a Wi-Fi Direct connection with the peer Wi-Fi terminal and provides the received file attribute information to the controller 240. The controller 240 may provide the file attribute information to a user of the Wi-Fi terminal 200 and asks the user whether the at least one file corresponding to the file attribute information should be received.

The UI 220 may sense and/or receive a user's manipulation, generate an input signal corresponding to the sensed user's manipulation, provide the input signal to the controller 240, and display or otherwise output information for the user under the control of the controller 240. For some or all of these purposes, the UI 220 may include at least one of one or more logical or physical buttons, a display, a touch screen, a gesture sensing module, a speaker, and/or a microphone. More particularly, the UI 220 may include one or more input devices and/or techniques to generate a user input signal related to execution of a Wi-Fi function for a Wi-Fi service, for example, a user input signal related to initiation of a connection setup between Wi-Fi terminals, selection of a file to be transmitted, or acceptance or rejection of file transmission. In addition, the UI 220 may include an output device and/or technique to display information about a file to be received.

The memory 230 may store program codes and data that are executed and processed in the Wi-Fi terminal 200. The memory 230 may include one or more volatile memory devices and/or one or more non-volatile memory devices. For example, the memory 230 may permanently or temporarily store an operating system (OS) of the Wi-Fi terminal 200, information and data exchanged through the Wi-Fi module 210, at least one file to be transmitted, and information about the at least one file.

The controller 240 may facilitate overall control of the Wi-Fi terminal 200. The controller 240 may control operations related to execution of functions used to provide a Wi-Fi service in the Wi-Fi terminal 200. The controller 240 may also control operations related to a file transmission service in the Wi-Fi terminal 200. Specifically, the controller 240 may generate file attribute information about a file to be transmitted based on the file itself and/or a user input or retrieves the file attribute information from the memory 230, and control the Wi-Fi module 210 to transmit the file attribute information to the peer terminal. In addition, the controller 240 may interpret received file attributed information about a file to be received from the peer Wi-Fi terminal, output the file attribute information through the UI 220, and receive information about a user intention from the UI 220. If the user does not accept the file transmission, the controller 240 may command the Wi-Fi module 210 to discontinue setup of a Wi-Fi Direct connection with the peer Wi-Fi terminal.

Operations of the controller 240 according to certain embodiments of the present disclosure will be described below. Besides the above-described operations, the controller 240 may perform control operations related to typical functions of the Wi-Fi terminal 200. For example, the controller 240 may control a communication function using a mobile communication network, when an application is executed based on the communication function. When an application having a communication function is executed, the controller 240 may also control the communication function.

Figure 3:
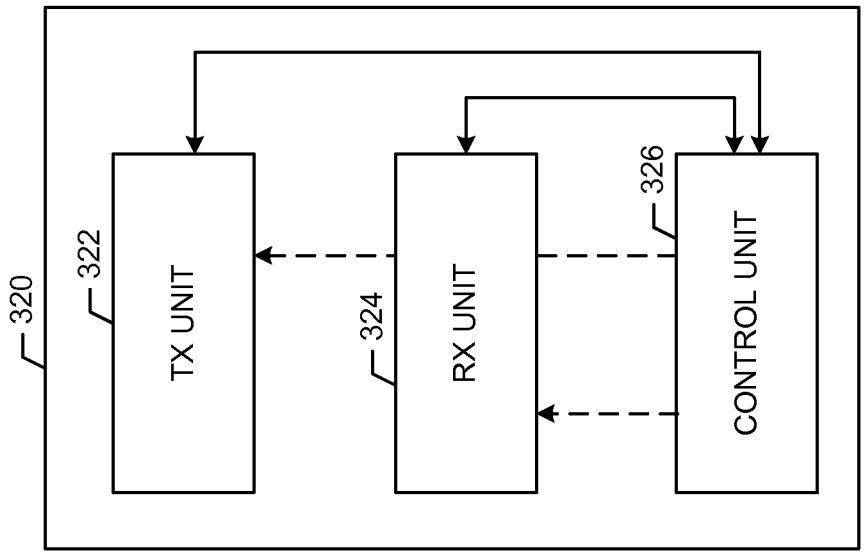
FIG. 3 is a block diagram of an example transmitting terminal and a receiving terminal, according to at least one embodiment.
Figure 3:
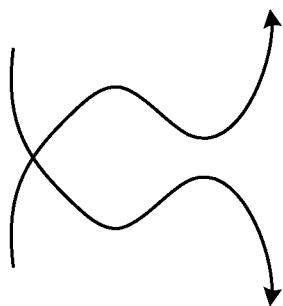
Figure 3:
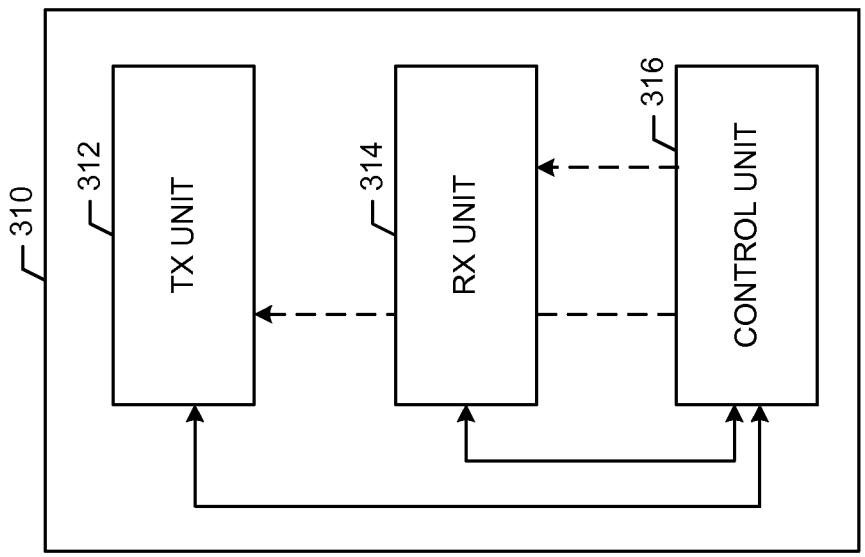

FIG. 3 is a block diagram of an example transmitting terminal and receiving terminal according to at least one embodiment of the present disclosure. In FIG. 3, within a transmitting terminal 310, a transmitting unit 312 may transmit, in a predetermined message or frame, file attribute information about a file to be transmitted by the transmitting unit 312 to a receiving terminal 320 during Wi-Fi Direct connection setup or Wi-Fi AP connection setup. The message or frame may be a message available for a Wi-Fi Direct service, for example, a genetic advertisement service (GAS) initial request action frame or a Peer-to-Peer (P2P) public action frame.

A receiving unit 314 may receive information about a user intention as to whether a user of the receiving terminal 320 will accept or reject file transmission. The user intention information may be transmitted, for example, in a GAS initial request action frame or a P2P public action frame. A control unit 316 may determine, based on the user intention information received from the receiving terminal 320, whether to continue or discontinue the Wi-Fi connection setup with the receiving terminal 320.

In the receiving terminal 320, a receiving unit 324 may receive from the transmitting terminal 310 file attribute information about a file to be transmitted by the transmitting terminal 310. A transmitting unit 322 may transmit information about the user intention as to whether the user of the receiving terminal 320 will accept or reject the file transmission to the transmitting terminal 310 under the control of a control unit 326. The control unit 326 may ask the user whether the transmission service from the transmitting terminal 310 should be accepted based on the received file attribute information, and may generate and transmit the user intention information to the transmit unit 322. The control unit 326 may determine, based on the user intention information, whether to continue or discontinue the Wi-Fi Direct connection setup with the transmitting terminal 310.

Certain embodiments of the present disclosure may be directed to techniques for making a wireless direct service, referred to as a Wi-Fi Direct Service (WFDS), available using an application service platform (ASP).

With the emergence of applications around social networking, Internet of Things (IoT), wireless docking, etc., there is a need to design extremely low power solutions that may always be powered on. Multiple efforts are ongoing in the wireless industry to address this challenge. In the Wi-Fi Alliance (WFA), the Neighbor Aware Networking (NAN) program is defining a background, low power Wi-Fi device and service discovery mechanism. Bluetooth Low Energy also provides a power efficient mechanism for some of use cases. In addition, the Bluetooth special interest group is in the process of starting a low power service discovery program, for example, WiFi, WiGig, ZigBee, 3GPP, applications. The newly established WiFi Alliance ASP2 (Application Service Platform Release 2) program extends the mechanism of WiFi Direct discovery to Bluetooth LE discovery and extends WiFi Direct connectivity to WiFi infrastructure and NAN data link. For example, two devices may use Bluetooth LE to discover each other and then set up a data session over WiFi Infrastructure.

Example embodiments of the present disclosure relate to systems, methods, and devices for Bluetooth low energy discovery in Wi-Fi ASPs. One example procedure includes a) a two-way Bluetooth message exchange, or optionally 4-way, or 6-way message exchange, to trigger a Wi-Fi radio, b) the use of Wi-Fi P2P discovery, Wi-Fi Aware (NAN), or Wi-Fi infrastructure discovery, and c) the start/setup of a data session over P2P connectivity, NAN Data Link, or Wi-Fi infrastructure. Although connectivity radios described with reference to example embodiments disclosed herein is Wi-Fi, this invention may be applied to other wireless protocols, such as WiGig, ZigBee, to name a few.

Figure 4:
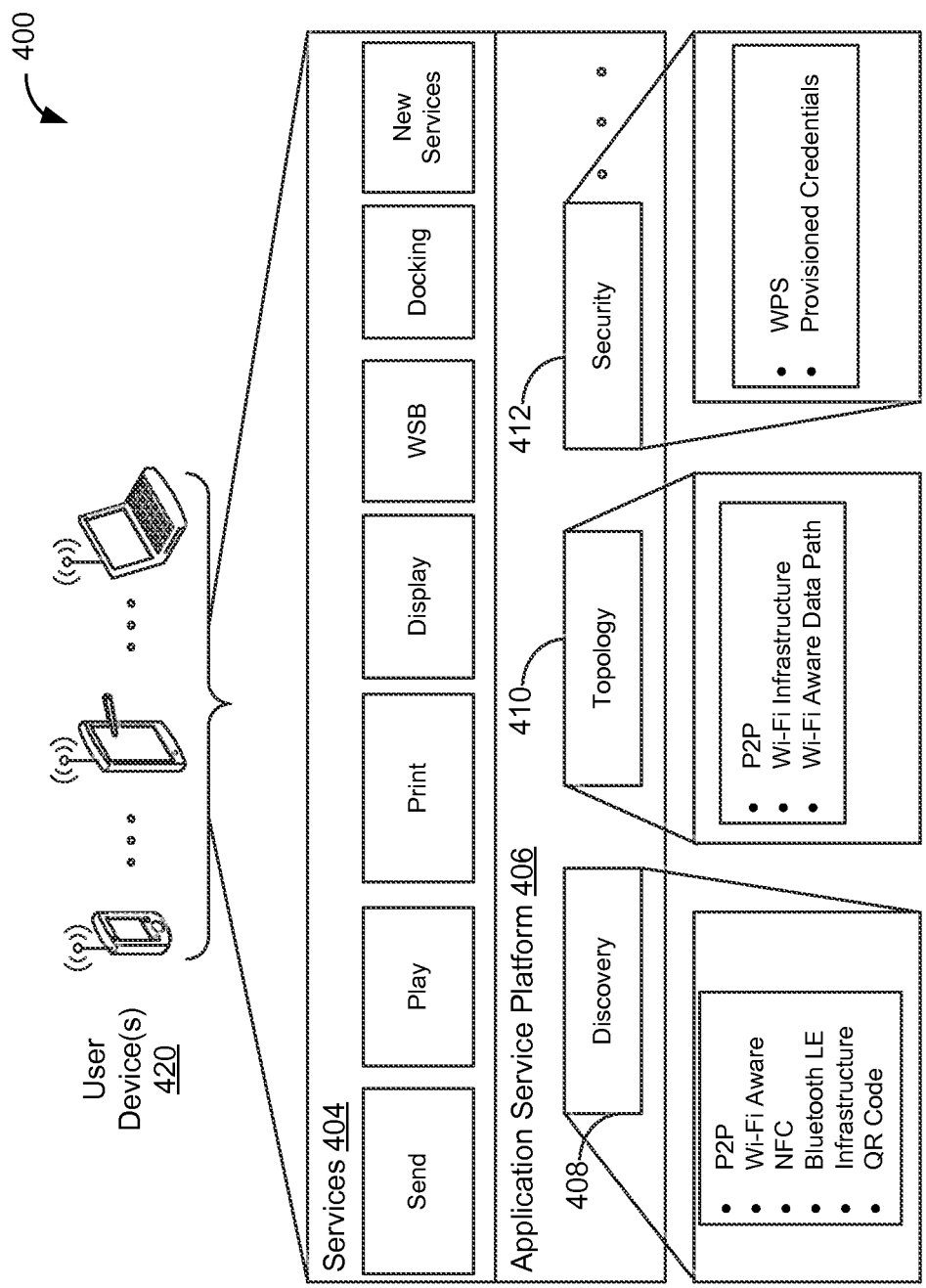
FIG. 4 depicts an illustrative schematic diagram of an example wireless communications stack including discovery and connectivity methods, in accordance with one or more embodiments of the disclosure.

FIG. 4 depicts an illustrative schematic diagram of an example wireless communications stack 400 including discovery and connectivity methods using a flexible connectivity framework (FCF) and based on Application Service Platform 2.0 (ASP2), in accordance with one or more embodiments of the disclosure.

The wireless communication stack of FIG. 4 includes a set of services 404 and an application service platform (ASP) 406. The services 404 may include various services that may be provided or used by a user device 420 such as, but not limited to, a send service, a play service, a print service, a display service, a Wi-Fi serial bus (WSB) service, a docking service, or other services. The services 404 may support wireless serial protocols, such as Wi-Fi serial bus (WSB). The services 404 may be any service defined by the ASP and/or ASP2, which may be referred to for more detail, such as sending content, playing content, printing content, displaying content, docking, WSB, etc. The ASP 406 may provide discovery and topology mechanisms and a security mechanism 412. FCF may include the functions of discovery 408, topology 410 and security 412. Discovery 408 refers to the ability of the user device(s) 420 to discover each other using one or more protocols. For example, under ASP2, discovery 408 may include, in addition to P2P discovery, Wi-Fi Aware data path discovery, BLE discovery, and NFC discovery. Topology 410 may include connectivity topologies that facilitate the connection between the two or more user device(s) 420. For example, topology 410 may use Wi-Fi infrastructure and Wi-Fi Aware data path.

In one embodiment, FCF may provide the capability of utilizing the various discovery methods and connectivity methods to provide a unified application interface to allow applications/users to specify services and connections without the need for the user to select the discovery or connectivity method. For example, an advertiser (e.g., user device 420) and a seeker (e.g., user device 420) may not know what type of connectivity that they could connect through in order to share services.

Figure 5:
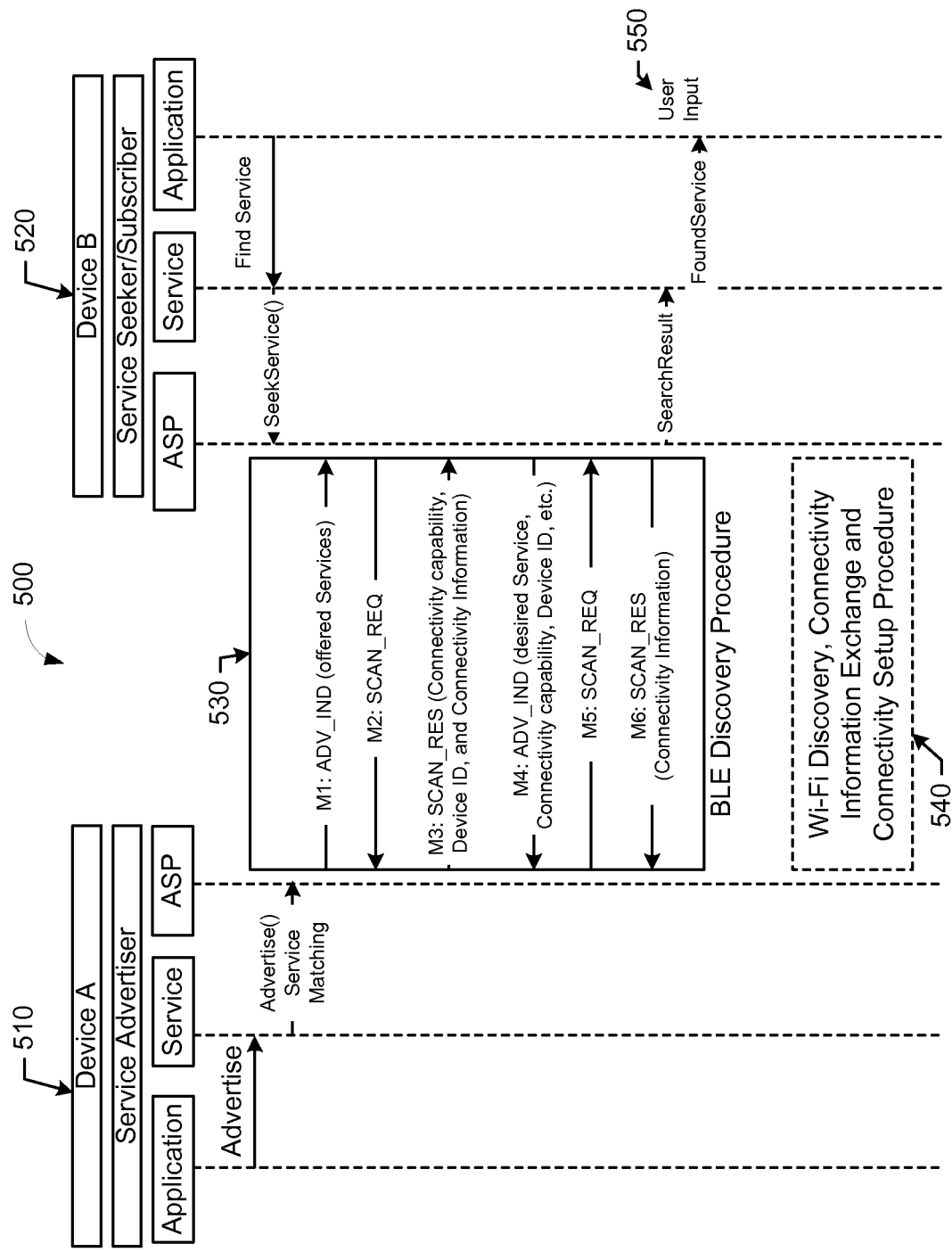
FIG. 5 depicts an example of an illustrative schematic message flow between components of a flexible connectivity framework system, in accordance with one or more embodiments of the disclosure.

FIG. 5 is a flow diagram illustrating an example communication flow 500 of a Wi-Fi Direct connection or service session setup, according to one or more embodiments of the present disclosure. More specifically, FIG. 5 illustrates 6-ways message exchange 530 between a device A 510 (e.g. a service advertiser) and device B 520 (e.g. a service seeker or subscriber) to use BLE radio to trigger Wi-Fi Discovery in Wi-Fi Application Service Platform applications. As illustrated in FIG. 5, the BLE device who is an advertiser 510 may advertise all offered services in a BLE advertise message (ADV_IND). Optionally, the receiving device may transmit a scan request message (SCAN_REQ) to get Connectivity Capability and Connection Information from the advertiser via a scan response message (SCAN_RES). A BLE device performing in the role of a seeker 520 scans to find other devices that support the desired services. If the seeker device finds the desired services, the seeker device may transmit a BLE advertise message (ADV-IND) to trigger Wi-Fi Discovery. Optionally, the advertiser 510 may transmit a scan request message (SCAN_REQ) to the seeker to confirm to trigger Wi-Fi Discovery, and the seeker device may then transmit a scan response message (SCAN_RES) to provide the connectivity information.

In accordance with an aspect of the disclosure, a Wi-Fi device that is continuously running BLE, such a Wi-Fi device may utilize the BLE radio for discover desired services. Wi-Fi radio may be active when desired services are found.

In FIG. 5, the device A (also referred to herein as terminal B) 510 may act as a service advertiser and the device B (also referred to herein as terminal A) 520 may act as a service seeker or subscriber. In a file transmission service, terminal A 510 is a receiving terminal and terminal B 520 is a transmitting terminal. A connection may be established between terminal A 510 and terminal B 520 through Wi-Fi P2P interfaces or an AP interface.

The following paragraphs describe in further detail messages M1-M6 illustrated in FIG. 5. Message 1 (M1): M1 may be an ADV-IND packet. M1 may be used for an Advertiser to advertise the offered services. In ADV_IND packet, WFA specific data may include the WFA Header field: Bit 0-Bit 3 may be set to ASP2; Bit 4 may be set to Advertiser; Device ID: a 6-bytes MAC address to identify transmitting Wi-Fi device, device ID may be changed to avoid tracking; Service ID list: the Advertiser may offer services list. Service ID may be 6 bytes hash of Service Name. In one M1, maximum of 4 Service IDs may be included. If the advertiser offers more than 4 services, the advertiser may send another M1, for example.

Message 2 (M2): M2 may be SCAN_REQ. M2 is used by the Seeker to request connectivity information.

Message 3 (M2): M3 may be SCAN_RES, in responding of SCAN_REQ. In SCAN_RES packet, WFA specific data may include the following fields: WFA Header field: Bit 0-Bit 3 is set to ASP2; Bit 4 is set to Advertiser; Device ID: a 6-bytes MAC address to identify transmitting Wi-Fi device (Device ID may be changed to avoid tracking); Connectivity Capability: one byte to indicate what connectivity is support. For example: Bit 0: Wi-Fi Direct; Bit 1: Wi-Fi infrastructure; Bit 2: NAN; Bit 3: IBSS, etc.; Connectivity Information: Connectivity information may include a set of Wi-Fi connection information to assist to start Wi-Fi discovery or connectivity. For example, if Wi-Fi Direct is supported, this field shall include P2P interface address and P2P Listen channel/band. If NAN is supported, this field shall include NAN interface, NAN Cluster ID, and Availability (Channel/band and time slot). If Wi-Fi infrastructure is supported, this filed shall include IP Address subnet mask, etc.

Message 4 (M4): M4 may be an ADV-IND, and is used by Seeker to trigger Wi-Fi Radio or Wi-Fi Discovery. In ADV-IND packet, WFA specific data may include the following fields: WFA Header field: Bit 0-Bit 3 is set to ASP2; Bit 4 is set to Seeker; Device ID: a 6-bytes MAC address to identify transmitting Wi-Fi device (Device ID may be changed to avoid tracking); Connectivity Capability: one byte to indicate what connectivity is support. For example Bit 0: Wi-Fi Direct; Bit 1: Wi-Fi infrastructure; Bit 2: NAN; Bit 3: IBSS, etc.; Connectivity Information: Connectivity information may include a set of Wi-Fi connection information to assist to start Wi-Fi discovery or connectivity. For example, if Wi-Fi Direct is supported, this field shall include P2P interface address and P2P Listen channel/band. If NAN is supported, this field shall include NAN interface, NAN Cluster ID, and Availability (Channel/band and time slot). If Wi-Fi infrastructure is supported, this filed may include IP Address, subnet mask, etc.

Message 5 (M5): M5 may be SCAN_REQ. M2 is used by the Advertiser to confirm starting Wi-Fi Radio or staring Wi-Fi Discovery, optionally. Seeker may start Wi-Fi radio or Wi-Fi discovery without waiting for conformation.

Message 6 (M6): M6 may be SCAN_RES, in response of SCAN_REQ. The contents in SCAN_RES may be same as the contents in M4, for example.

According to one example embodiment, in terminal A 510, a service process may advertise a service(s) to an ASP of the Terminal A 510 by an AdvertiseService command so that another terminal, for example, terminal B may discover an ASP session related to the advertised service(s) and be initialized. When an application is executed and a service use command is generated to transmit a specific file in terminal B, a service process of terminal B may transmit a SeekService command requesting service discovery to an ASP of terminal B. In response to the command, the ASP of terminal B may transmit a P2P Probe Request with a hash value generated based on a service name to the ASP of terminal A in operation. In other words, the seeker may send a request message with a list of service identities, for example, in operation.

The ASP of terminal A may judge whether the hash value of the service name to be advertised is matched to the hash value received in the P2P probe request. If the hash values are matched, the ASP of terminal A may transmit a P2P probe response to the ASP of terminal B. The P2P probe response may include the service name confirmed by hash matching and the advertisement ID of the service to be advertised from terminal A. In other words, the service advertiser may send a response message to the seeker with a list of service providers' information.

The ASP of terminal B may transmit the service name to be connected and a service information request, including additional information needed for service discovery, to terminal A through a P2P service discovery request. The ASP of terminal A may determine whether there is a string matched to the service name and service information received in the P2P service discovery request. Upon detection of the matched string, the terminal A may transmit a P2P service discovery response including the name and advertisement ID of the service and a service status to the terminal B. The service status may indicate whether the terminal A accepts connection of the service.

The ASP of terminal B may transmit, to the service process, a terminal list including at least one terminal, including the terminal A identified by the P2P service discovery response. The service process may indicate the terminal list to a user by the application. In operation 550, the application may sense a user input that selects at least one terminal in the terminal list and notify the service process of the selected terminal. The service process may request a session connection setup with the selected terminal to the ASP of terminal B.

In operation 540, the ASP of terminal B may transmit a P2P provision discovery request including session information, which may represent file attribute information about one or more files to be transmitted and connection capabilities, to the ASP of terminal A and may also transmit a ConnectStatus event indicating transmission of a service request to the service process of terminal B. The P2P provision discovery request may include at least one of the number, total size, and names of the file(s), as the file attribute information. The ASP of terminal A may transmit to the ASP of terminal B a P2P provision discovery response indicating successful reception of the P2P provision discovery request, which may include a status code that requests deferral of a service request until a user input is confirmed. The ASP of terminal B may transmit a ConnectStatus event indicating deferral of the service request to the service process. The service process of terminal B may recognize deferral of the service request until a user intention of terminal A is confirmed and may activate a timer in response to the ConnectStatus event. The timer may be reset when a P2P provision discovery request, indicating the user intention, is received from terminal A.

The ASP of terminal A may notify the service process of the session request in response to the P2P provision discovery request received from terminal B. When needed, the service process of terminal A may activate an application of the Wi-Fi Direct service and may transmit session information with the file attribute information to the application.

In certain embodiments, an additional operation may be executed, wherein the application of terminal A may request a user input 550 by displaying information about the files on a screen based on the file attribute information read from the session information. Upon detection of a user input 550 indicating acceptance of the file transmission service, the application may notify the service process of the user acceptance and the service process may transmit a SessionConfirm command indicating confirmation of a session setup to the ASP of terminal A. When transmitting the session information to the application, the service process of terminal A may activate a timer. When a user input is received, the timer may be reset. In another embodiment of the present disclosure, if a user input has not been detected before expiration of the timer, the service process of terminal A may transmit a SessionConfirm command indicating acceptance of the file transmission service according to a presetting in the ASP.

In operation 540, the ASP of terminal A may transmit a P2P provision discovery request including a status code indicating acceptance and, when needed, the session information to the ASP of terminal B in response to the SessionConfirm command received from the service process. The ASP of terminal B may provide a ConnectStatus event indicating acceptance of the service request to the service process and continuously perform the remaining operations of the session setup procedure.

Figure 6:
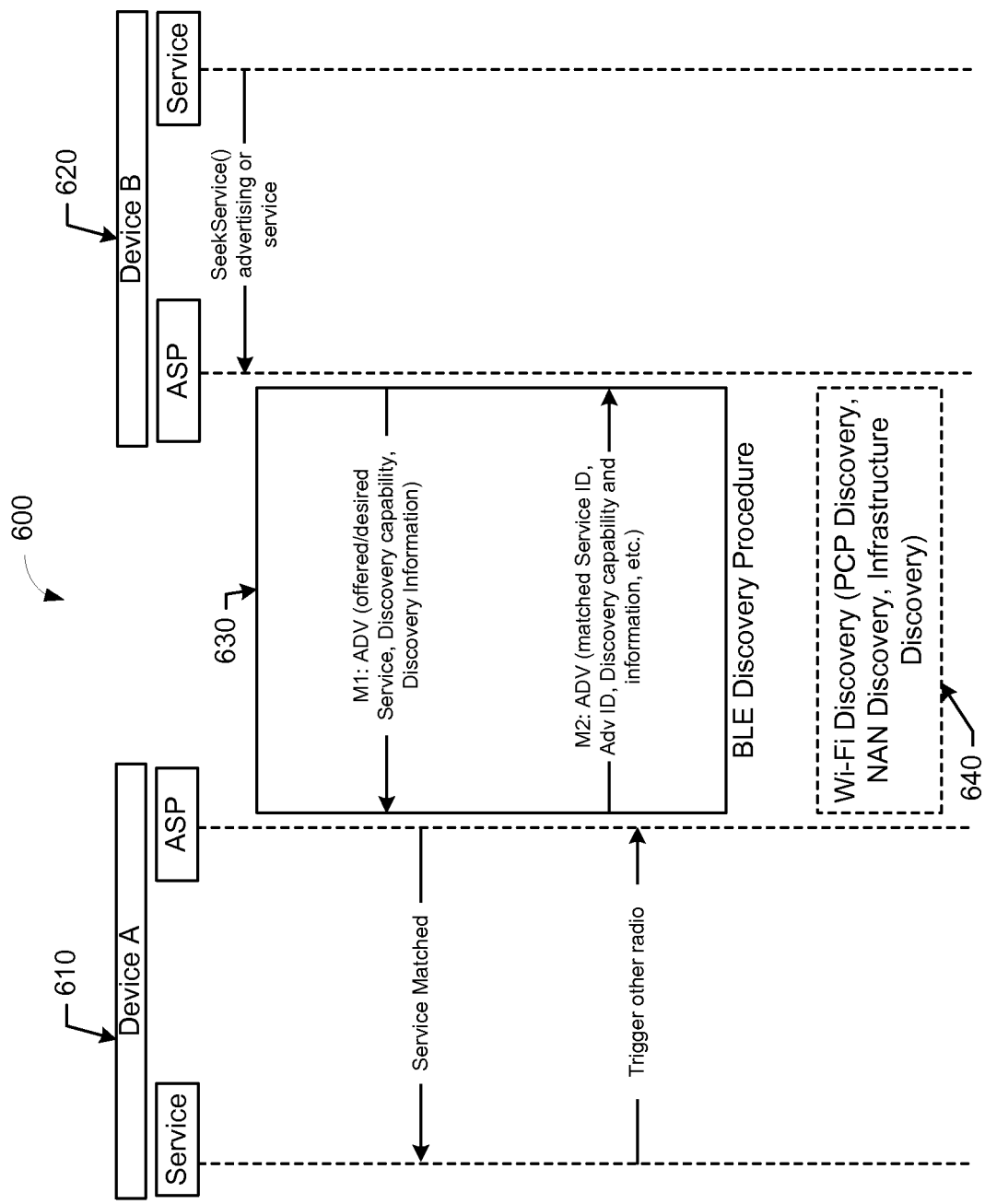
FIG. 6 illustrates a method for Bluetooth low energy (BLE) discovery, according to at least one embodiment.

FIG. 6 illustrates a 2-way message exchange 600 to use BLE radio to trigger Wi-Fi Discovery in Wi-Fi Application Service Platform applications. In this example, device B 620 may send an advertisement packet ADV to device A 610, which may include information about offered or desired service, discovery capability of device B and discovery information. If there is a service marched with device A, then device A may send a second advertisement packet ADV to device B, which may include the matched service ID, the advertisement ID, discover capability for device A, and discovery information. After the BLE discovery procedure is completed at 630, device A and device B may perform Wi-Fi discovery including P2P discovery, NAN discovery, or infrastructure discovery 640 as discussed in the above example embodiments.

Figure 7:
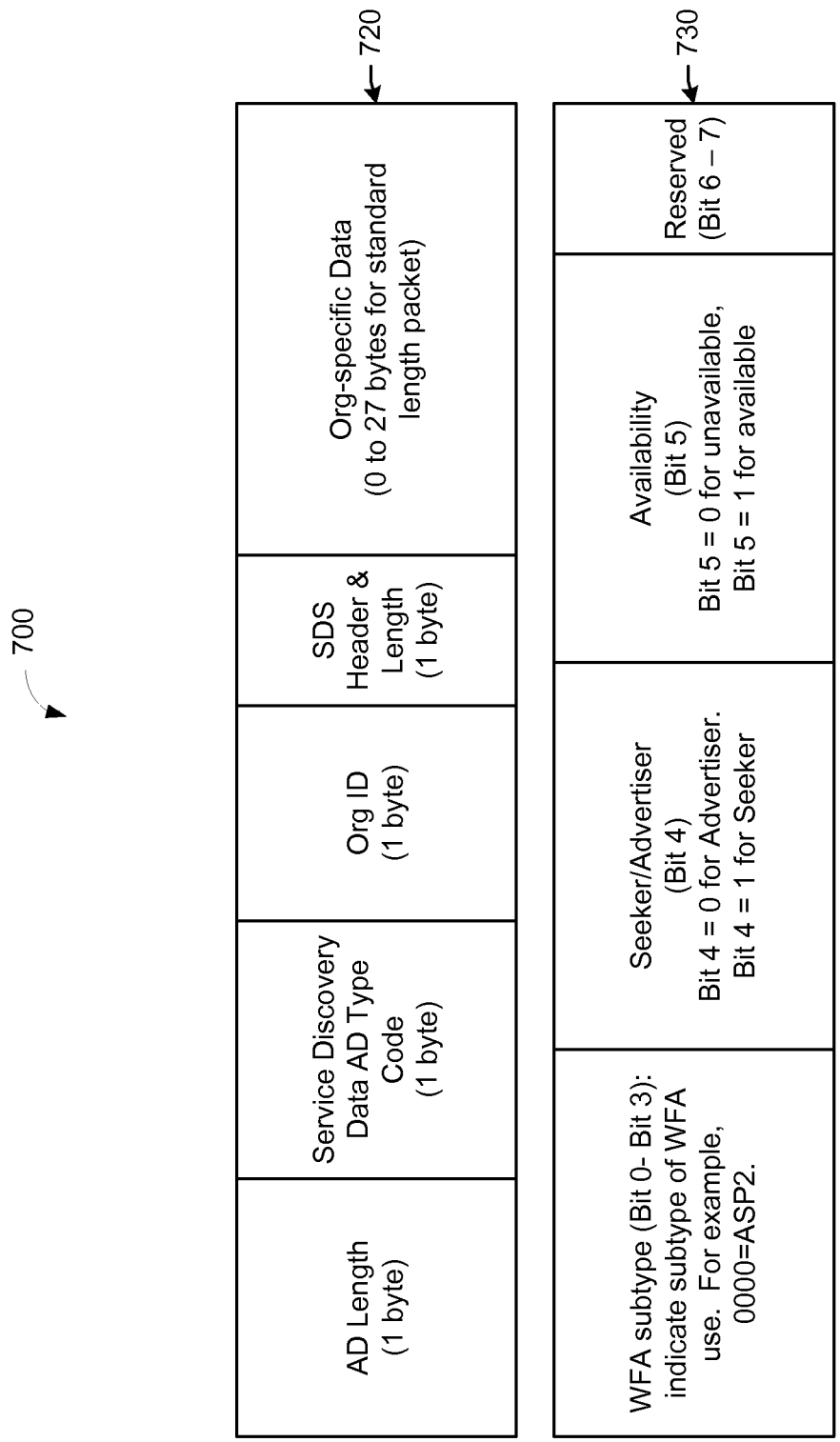
FIG. 7 illustrates an example format of BLE service advertising packet and Wi-Fi specific data field, according to at least one embodiment.

FIG. 7 illustrates an example format of a BLE DOT Service Advertising packet 720 that may be used in conjunction with the embodiment disclosed in FIGS. 5 and 6, for example. In the field of SDS Header and Length, Bit 0-Bit 2 may be used for SDS header. Bit 3-Bit 7 may be used to specify the length of the following Org-Specific data (e.g., WFA Specific data). In the WiFi Alliance (WFA) specific data field, the first field may be a WFA header field. The WFA header field 730 may be defined, for example, as illustrated at the bottom on FIG. 7, which may include the WFA subtype in Bit 0-Bit 3 indicating the subtype of WFA use, for example, 0000=ASP2. The WFA header 730 may also include seeker or advertiser information in Bit 4, for example, Bit 4=0 for Advertiser, and Bit 4=1 for Seeker. The WFA header may also include availability in Bit 5, for example Bit 5=0 for unavailable, and Bit 5=1 for available. The WFA header 730 may also include reserved bits 6-7, which may be reserved for additional information.

According to one example embodiment, the service identity (SID) may be a 6 octet hash value of the service name. It should be noted, however, that service hash and service identity are defined and used in the Wi-Fi Alliance WFDS technical specification. Service identity may be carried in the request message, as described above. According to one or more embodiments, service provider information (SPI) attribute may include a set of data points for the API interface that provides the corresponding service. The SPI attribute may be carried in the response message or unsolicited advertisement. The SPI attribute may include information, such as for example, a service ID which may indicate the service that the device may provide, an advertisement ID which may indicate an advertisement identifier of an instance that may provide the service, and/or a service media access control (MAC) address which may indicate the interface used by the device to provide service. For example, if the device provides a print service on the Wi-Fi Direct interface, then the service MAC address may be the device address of the Wi-Fi Direct interface. The SPI attribute may include additional information, such as for example, a network information mode, which may be conveyed using bit information. For example, Bit 0 and Bit 1 may convey a connection type, in that 00 may indicate the service is provided via a P2P link, while 01 may indicate the service is provided via AP infrastructure link, and 10, 11 may indicate that the network is reserved. Similarly, Bit 2 may indicate that the regulatory class and channel fields are included; Bit 3 may indicate that the basic service set identification (BSSID) field is included; Bit 4 may indicate that the service set identification (SSID) field is included; Bit 5 may indicate that the network ID is included; and Bits 6 and 7 may indicate that the network is reserved. The SPI attribute may include additional information, such as for example, a regulatory class, channel information, BSSID, SSID, and/or a network ID. A regulatory class may indicate the frequency band at which the AP/group owner may be currently operating or the P2P device may be listening, for example. Channel information may indicate the channel number corresponding to the indicated regulatory class on which the AP/group owner may be currently operating, or the P2P device may be listening. BSSID may refer to AP's or group owner's MAC address, for example, SSID may refer to SSID of the AP's or group owner's to associate with in order to be connected with the network interface of the device, and network ID may refer to portion of the IP address that is used to identify devices on a network such as a local area network or the Internet. The length of SPI attribute may vary from 17 octets to 79 octets. However, if the SPI is included in a BLE packet, the first 19 octets may be recommended to be included due to BLE packet length constraints. In other words, the length of a BLE adverting payload may be up to 27 octets: 5 bytes may be overhead and up to 22 bytes may be available for SIG/SDO use.

In some embodiments, the discovery procedure may include a seeker transmitting a request message including a list of service identities, and an advertiser transmitting a response message including a list of service provider information in response to the request message. An advertiser may also transmit an advertisement message (unsolicited response) that may include a list of service provider information, for example. If multiple service provider information attributes for a service are available, the order in which the list of service provider information is included in the frame may indicate the corresponding order of preference. That is, the higher in priority, the earlier in the list of the service, for example. Once the Seeker receives service provider information, the seeker may proceed with service discovery (optional, may be either P2P link or AP infrastructure), P2P provision discovery (optional, only applied to an ASP session over P2P link), and establish an ASP session over corresponding network link that is provided in the service provider information, for example.

Figure 8:
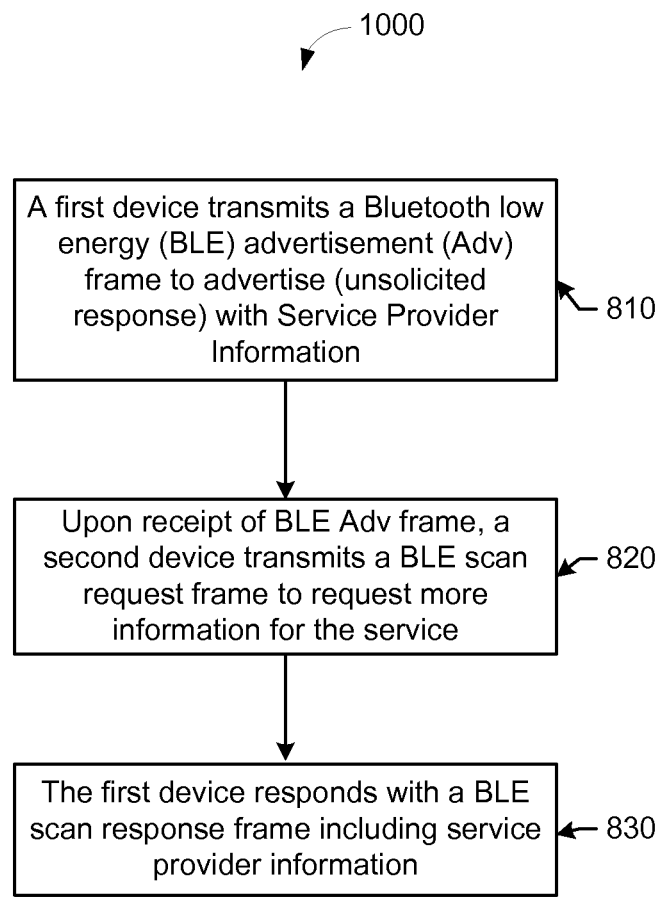
FIG. 8 is a flowchart illustrating an example method for discovery via BLE, according to at least one embodiment.

FIG. 8 illustrates a flow diagram showing operations in an example discovery process via BLE discovery, according to one or more embodiments of the present disclosure. As shown in FIG. 8, in operation 810, a first wireless device (e.g. an advertiser) may transmit a BLE Adv frame to advertise (unsolicited response) with service provider information, for example. In operation 820, in response to the BLE Adv frame, a second wireless device (e.g. a seeker) may transmit a BLE Scan_Req frame to request more information for the respective service, for example. In operation 830, in response to the BLE Scan_Req, the first device (the advertiser) may respond with a BLE Scan_Response frame including service provider information, for example.

Figure 9:
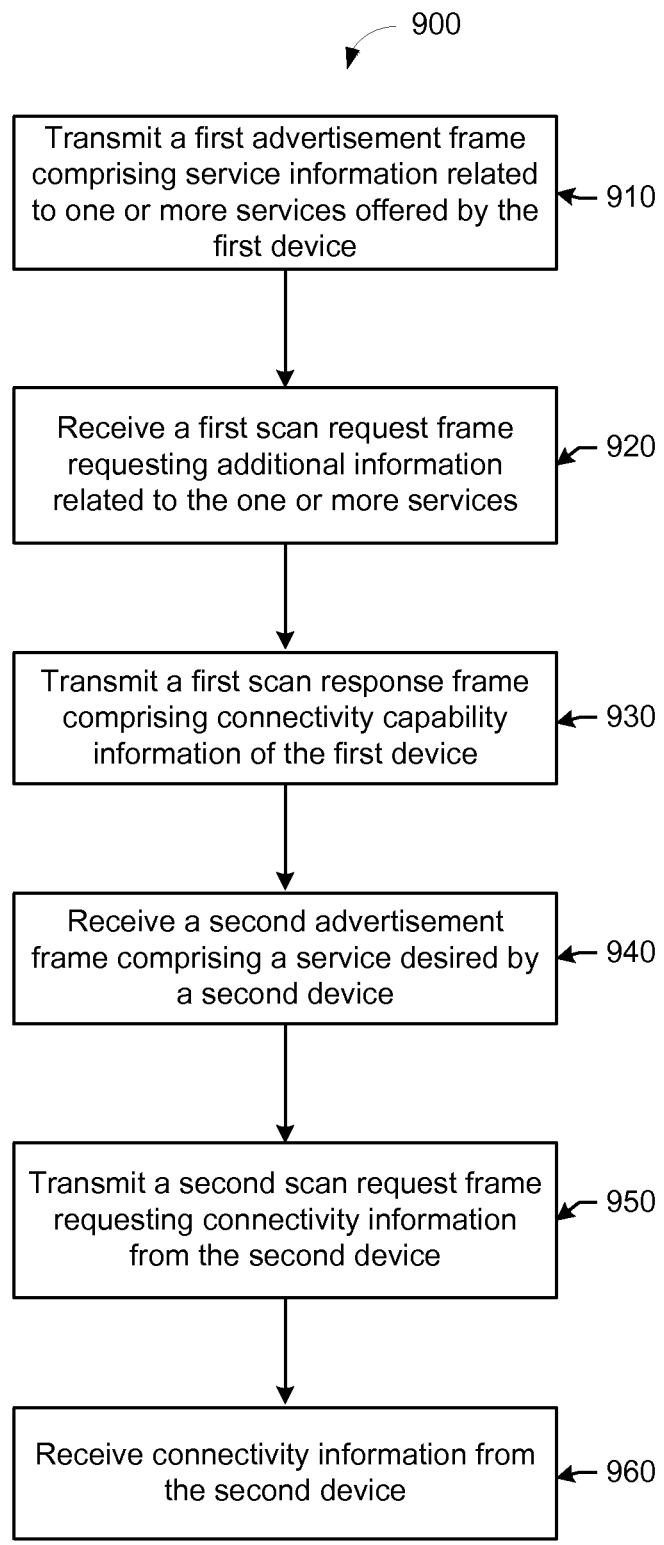
FIG. 9 is a flowchart illustrating an example method for discovery via BLE, according to at least one embodiment.

FIG. 9 illustrates a flow diagram showing operations in an example discovery process via BLE discovery, according to one or more embodiments of the present disclosure. As shown in FIG. 9, from the perspective of the advertiser device, in operation 910, a first wireless device (e.g. an advertiser) may transmit a first advertisement frame including service information related to one or more services offered by the first wireless device. In operation 920, the first wireless device may receive a first scan request frame from a second device requesting additional information related to the one or more services offered by the first device. In operation 930, the first wireless device may transmit a first scan response frame including connectivity capability information of the first wireless device. In operation 940, the first wireless device may receive a second advertisement frame comprising a service desired by the second device. In operation 950, the first wireless device may transmit a second scan request frame requesting connectivity information from the second device. In operation 960, the first wireless device may receive the connectivity information from the second device.

Certain technical effects or solutions may be accomplished by certain embodiments of the disclosure, for example, embodiments disclosed herein may provide data that needs to be processed at the application/service level in the context of what the application/service accomplishes in order to determine how to connect to the discovered device so that the resulting user experience is the best, for example. Example embodiments disclosed herein may reduce the number of management frames used by Wi-Fi for device/service discovery, extend battery life due to the use of low power discovery mechanisms, and enable faster discovery and as a result faster ASP session establishment, for example. It should be appreciated that the above examples of technical effects and/or solutions of the present disclosure are merely illustrative and that numerous other technical effects and/or solutions may, exist.

Figure 10:
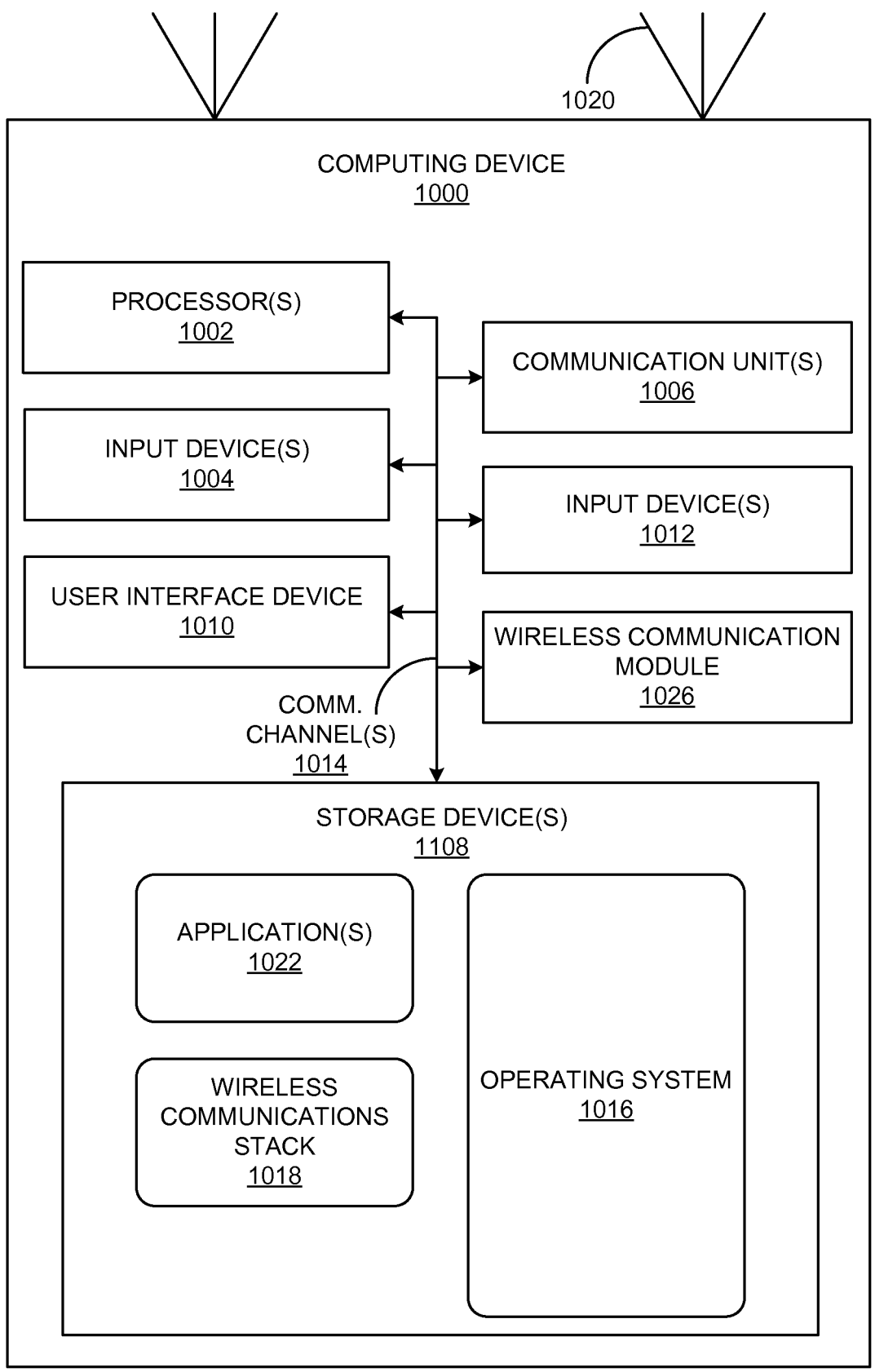
FIG. 10 is a block diagram illustrating an example instance of a computing device operating according to at least one embodiment.

FIG. 10 is a block diagram illustrating an example instance of a computing device 1000 operating according to methods in accordance with one or more embodiments of the present disclosure. FIG. 10 illustrates only one particular example of computing device 1000, and other examples of computing device 1000 may be used in other instances. Although shown in FIG. 10 as a stand-alone computing device 1000 for purposes of example, a computing device may be any component or system that includes one or more processors or other suitable computing environment for executing software instructions and, for example, need not necessarily include one or more elements shown in FIG. 10 (e.g., input devices 1004, user interface devices 1010, output devices 1012).

As shown in the specific example of FIG. 10, computing device 1000 may include one or more processors 1002, one or more input devices 1004, one or more communication units 1006, one or more output devices 1012, one or more storage devices 1008, and user interface (UI) device 1010, and wireless communication module 1026. Computing device 1000 may also include one or more radios 1020, such as for example one or more antennas 1020, that enable the computing device to communicate with one or more other computing devices. Computing device 1000, in one example, further includes wireless communications stack 1018, authorization module 1020, one or more applications 1022, and operating system 1016 that are executable by computing device 1000. Each of components 1002, 1004, 1006, 1008, 1010, 1012, and 1026 are coupled (physically, communicatively, and/or operatively) for inter-component communications. In some examples, communication channels 1014 may include a system bus, a network connection, an inter-process communication data structure, or any other method for communicating data. As one example in FIG. 10, components 1002, 1004, 1006, 1008, 1010, 1012, and 1026 may be coupled by one or more communication channels 1014. Wireless communications stack 1018, authorization module 1020, and one or more applications 1022 may also communicate information with one another as well as with other components in computing device 1000. While illustrated as separate modules, any one or more of modules 1018 or 1020 may be implemented as part of any of applications 1022.

Processors 1002, in one example, are configured to implement functionality and/or process instructions for execution within computing device 1000. For example, processors 1002 may be capable of processing instructions stored in storage device 1008. Examples of processors 1002 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 1008 may be configured to store information within computing device 1000 during operation. Storage device 1008, in some examples, is described as a computer-readable storage medium. In some examples, storage device 1008 is a temporary memory, meaning that a primary purpose of storage device 1008 is not long-term storage. Storage device 708, in some examples, is described as a volatile memory, meaning that storage device 708 does not maintain stored contents when the computer is turned off. Examples of volatile memories include random access memories (RAM), dynamic random access memories (DRAM), static random access memories (SRAM), and other forms of volatile memories known in the art. In some examples, storage device 1008 is used to store program instructions for execution by processors 1002. Storage device 1008, in one example, is used by software or applications running on computing device 1000 to temporarily store information during program execution.

Storage devices 1008, in some examples, may also include one or more computer-readable storage media. Storage devices 1008 may be configured to store larger amounts of information than volatile memory. Storage devices 1008 may further be configured for long-term storage of information. In some examples, storage devices 1008 may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 1000, in some examples, may also include one or more communication units 1006. Computing device 1000, in one example, may utilize communication unit 1006 to communicate with external devices via one or more networks, such as one or more wireless networks. Communication unit 1006 may be a network interface card, such as an Ethernet card, an optical transceiver, a radio frequency transceiver, or any other type of device that may send and receive information. Other examples of such network interfaces may include Bluetooth, 7G and Wi-Fi radios computing devices as well as universal serial bus (USB). In some examples, computing device 1000 may utilize communication unit 1006 to wirelessly communicate with an external device such as a server.

In addition, the computing device 1000 may include wireless communication module 1026. As described herein, wireless communication module 1026 may be active hardware that is configured to communicate with other wireless communication devices. These wireless communication devices may operate according to Bluetooth, Ultra-Wideband radio, Wi-Fi, or other similar protocols. In some examples, wireless communication module 1026 may be an external hardware module that is coupled with computing device 1000 via a bus (such as via a universal serial bus (USB) port). Wireless communication module 1026, in some examples, may also include software which may, in some examples, be independent from operating system 1016, and which may, in some other examples, be a sub-routine of operating system 1016.

Computing device 1000, in one example, also includes one or more input devices 1004. Input device 1004, in some examples, is configured to receive input from a user through tactile, gesticular, audio, or video feedback. Examples of input device 1004 include a presence-sensitive display, a mouse, a keyboard, a voice responsive system, video camera, gesture detection and/or capture device, microphone or any other type of device for detecting a command from a user.

One or more output devices 1012 may also be included in computing device 1000. Output device 1012, in some examples, is configured to provide output to a user using tactile, audio, or video stimuli. Output device 1012, in one example, may include a presence-sensitive display, a sound card, a video graphics adapter card, or any other type of device for converting a signal into an appropriate form understandable to humans or machines. Additional examples of output device 1012 may include a speaker, a cathode ray tube (CRT) monitor, a liquid crystal display (LCD), or any other type of device that may generate intelligible output to a user. In some examples, user interface (UI) device 1010 may include functionality of input device 1004 and/or output device 1012.

Computing device 1000 may include operating system 1016. Operating system 1016, in some examples, may control the operation of components of computing device 1000. For example, operating system 1016, in one example, may facilitate the communication of wireless communications stack 1018, and application 1022 with processors 1002, communication unit 1006, storage device 1008, input device 1004, user interface device 1010, wireless communication module 1026, and output device 1012. Wireless communications stack 1018 and application 1022 may also include program instructions and/or data that are executable by computing device 1000. As one example, modules 1018, 1020, and 1022 may include instructions that cause computing device 1000 to perform one or more of the operations and actions described in the present disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that may be accessed by one or more computers or one or more processors to retrieve instructions, code and/or data structures for implementation of the methods described in this disclosure. A computer program product may include a computer-readable medium.

By way of example, and not limitation, such computer-readable storage media may include RAM, ROM, EEPROM, CD-ROM or other optical disk storage, magnetic disk storage, or other magnetic storage devices, Flash memory, or any other medium that may be used to store desired program code in the form of instructions or data structures and that may be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the methods described herein. In addition, in some aspects, the functionality described herein may be provided within dedicated hardware and/or software modules configured for encoding and decoding, or incorporated in a combined codec. Also, the example methods described above could be fully implemented in one or more circuits or logic elements.

The example methods of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed example methods, but do not necessarily require realization by different hardware units. Rather, as described above, various units may be combined in a codec hardware unit or provided by a collection of interoperative hardware units, including one or more processors as described above, in conjunction with suitable software and/or firmware.

Example Embodiments

One example embodiment is a wireless device for performing Bluetooth low energy (BLE) discovery in a wireless environment. The device may include a BLE radio, at least one memory device including computer-executable instructions, and at least one processor configured to access the computer-executable instructions to perform the operations of transmitting a first advertisement frame may including service information related to one or more services offered or sought by the wireless device, and receiving a second advertisement frame may including a matched service identification of at least one service offered or sought by the wireless device. The first advertisement frame further may also include discovery capability of the wireless device or discovery information of the wireless device. The second advertisement frame may also include a second advertisement identification, discovery capability of a second wireless device sending the second advertisement frame, or discovery information of the second wireless device. The device may also be configured to establish a BLE connection with the second wireless device based at least in part on the matched service identification, and perform a Wi-Fi discovery operation. The first advertisement frame and/or the second advertisement frame may include an advertisement length, a service discovery data advertisement type, organization identification, SDS header or length, or organization specific data. The first advertisement frame and/or the second advertisement frame may include a Wi-Fi alliance subtype, a seeker or advertiser identification, availability information, or reserved bits.

Another example embodiment is a method for Bluetooth low energy (BLE) discovery in a wireless environment. The method includes transmitting, by a first device may including a radio, at least one memory device including computer-executable instructions, and at least one processor configured to access the computer-executable instructions, a first advertisement frame may including service information related to one or more services offered or sought by the first device, and receiving, by the first device, a second advertisement frame may including a matched service identification of at least one service offered or sought by the first device. The first advertisement frame further may include discovery capability of the first device or discovery information of the first device. The second advertisement frame further may include a second advertisement identification, discovery capability of a second device sending the second advertisement frame, or discovery information of the second device. The method may also include establishing, by the first device, a BLE connection with the second device based at least in part on the matched service identification, and performing, by the first device, a Wi-Fi discovery operation. The first advertisement frame and/or the second advertisement frame may include an advertisement length, a service discovery data advertisement type, organization identification, SDS header or length, or organization specific data. The header in the first advertisement frame and/or the second advertisement frame may include a Wi-Fi alliance subtype, a seeker or advertiser identification, availability information, or reserved bits.

Another example embodiment is a method for Bluetooth low energy (BLE) discovery in a wireless environment. The method may include transmitting, by a first device may including at least one memory device including computer-executable instructions and at least one processor configured to access the computer-executable instructions, a first advertisement frame may including service information related to one or more services offered by the first device, receiving, by the first device, a first scan request frame requesting additional information related to the one or more services offered by the first device, transmitting, by the first device, a first scan response frame may including connectivity capability information of the first device, receiving, by the first device, a second advertisement frame may including a service desired by a second device, transmitting, by the first device, a second scan request frame requesting connectivity information from the second device, and receiving, by the first device, connectivity information from the second device. The first scan response frame further may include device identification of the first device or connectivity information of the first device. The second advertisement frame further may include connectivity capability of the second device or device identification of the second device. The first advertisement frame further may include discovery capability of the first device or discovery information of the first device. The second advertisement frame further may include a second advertisement identification, discovery capability of a second device sending the second advertisement frame, or discovery information of the second device. The method may also include establishing, by the first device, a BLE connection with the second device based at least in part on the matched service identification, and performing, by the first device, a Wi-Fi discovery operation. The first advertisement frame and/or the second advertisement frame may include an advertisement length, a service discovery data advertisement type, organization identification, SDS header or length, or organization specific data. The header in the first advertisement frame and/or the second advertisement frame may include a Wi-Fi alliance subtype, a seeker or advertiser identification, availability information, or reserved bits.

The above description with reference to the accompanying drawings is provided to assist in a comprehensive understanding of certain embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments may be made without departing from the scope and spirit of the present disclosure. In addition, descriptions of well-known functions and constructions may be omitted for clarity and conciseness.

The terms used in the above description and following claims are not limited to their dictionary meanings, but, are merely used to enable a clear and consistent understanding of the present disclosure. Accordingly, it should be apparent to those skilled in the art that the following description of embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

What is claimed is:

1. A device for activating Wi-Fi using Bluetooth, the device comprising storage and processing circuitry, the processing circuitry coupled to the storage, the processing circuitry configured to:
    cause to send a first Bluetooth advertisement packet comprising a first indication of a neighbor awareness networking (NAN) service;
    identify a second Bluetooth advertisement packet received from another device;
    identify, in the second Bluetooth advertisement packet, an address identifying the other device, a second indication of the NAN service, and a NAN identifier, the NAN identifier different than the address; and
    cause to activate a Wi-Fi radio associated with the device based on identifying the second indication of the NAN service, wherein to cause to activate the Wi-Fi radio comprises to initiate a NAN link.

2. The device of claim 1, wherein the first Bluetooth advertisement packet is a Bluetooth low energy packet.

3. The device of claim 1, wherein the processing circuitry is further configured to perform NAN service discovery based on identifying the second indication of the NAN service.

4. The device of claim 1, wherein at least one of the first Bluetooth advertisement packet or the second Bluetooth advertisement packet further comprises Wi-Fi organization information.

5. The device of claim 4, wherein the Wi-Fi organization information is associated with activating the Wi-Fi radio.

6. The device of claim 1, further comprising a transceiver configured to cause the transmission and the reception of wireless signals, wherein the wireless signals comprise at least one of the first Bluetooth advertisement packet or the second Bluetooth advertisement packet.

7. The device of claim 6, further comprising one or more antennas coupled to the transceiver.

8. A non-transitory computer-readable medium storing computer-executable instructions which when executed by one or more processors of a first device result in performing operations comprising:
    identifying, at a first device, a first Bluetooth advertisement packet received from a second device, wherein the first Bluetooth advertisement packet comprises a first indication of a neighbor awareness networking (NAN) service;
    causing to send a second Bluetooth advertisement packet to the second device, wherein the second Bluetooth advertisement packet comprises an address identifying the first device, a second indication of the NAN service, and a NAN identifier, the NAN identifier different than the address; and
    causing to activate a Wi-Fi radio associated with the first device, wherein causing to activate the Wi-Fi radio comprises to initiate a NAN link.

9. The non-transitory computer-readable medium of claim 8, wherein the first Bluetooth advertisement packet is a Bluetooth low energy packet.

10. The non-transitory computer-readable medium of claim 8, the operations further comprising performing NAN service discovery.

11. The non-transitory computer-readable medium of claim 8, wherein at least one of the first Bluetooth advertisement packet or the second Bluetooth advertisement packet further comprises Wi-Fi organization information.

12. The non-transitory computer-readable medium of claim 11, wherein the Wi-Fi organization information is associated with activating the Wi-Fi radio.

13. A method, comprising:
    causing to send, by a first device, a first Bluetooth advertisement packet comprising a first indication of a neighbor awareness networking (NAN) service;
    identifying a second Bluetooth advertisement packet received from a second device;
    identifying, in the second Bluetooth advertisement packet, an address identifying the second device, a second indication of the NAN service, and a NAN identifier, the NAN identifier different than the address; and
    causing to activate a Wi-Fi radio associated with the first device based on identifying the second indication of the NAN service, wherein causing to activate the Wi-Fi radio comprises initiating a NAN link.

14. The method of claim 13, wherein the first Bluetooth advertisement packet is a Bluetooth low energy packet.

15. The method of claim 13, further comprising performing NAN service discovery based on identifying the second indication of the NAN service.

16. The method of claim 13, wherein at least one of the first Bluetooth advertisement packet or the second Bluetooth advertisement packet further comprises Wi-Fi organization information.

17. The method of claim 16, wherein the Wi-Fi organization information is associated with activating the Wi-Fi radio.

* * * * *